Nov. 3, 1925.
A. F. VICTOR
1,559,815
FILM TENSIONING AND FRAMING DEVICE
Filed Dec. 10, 1923
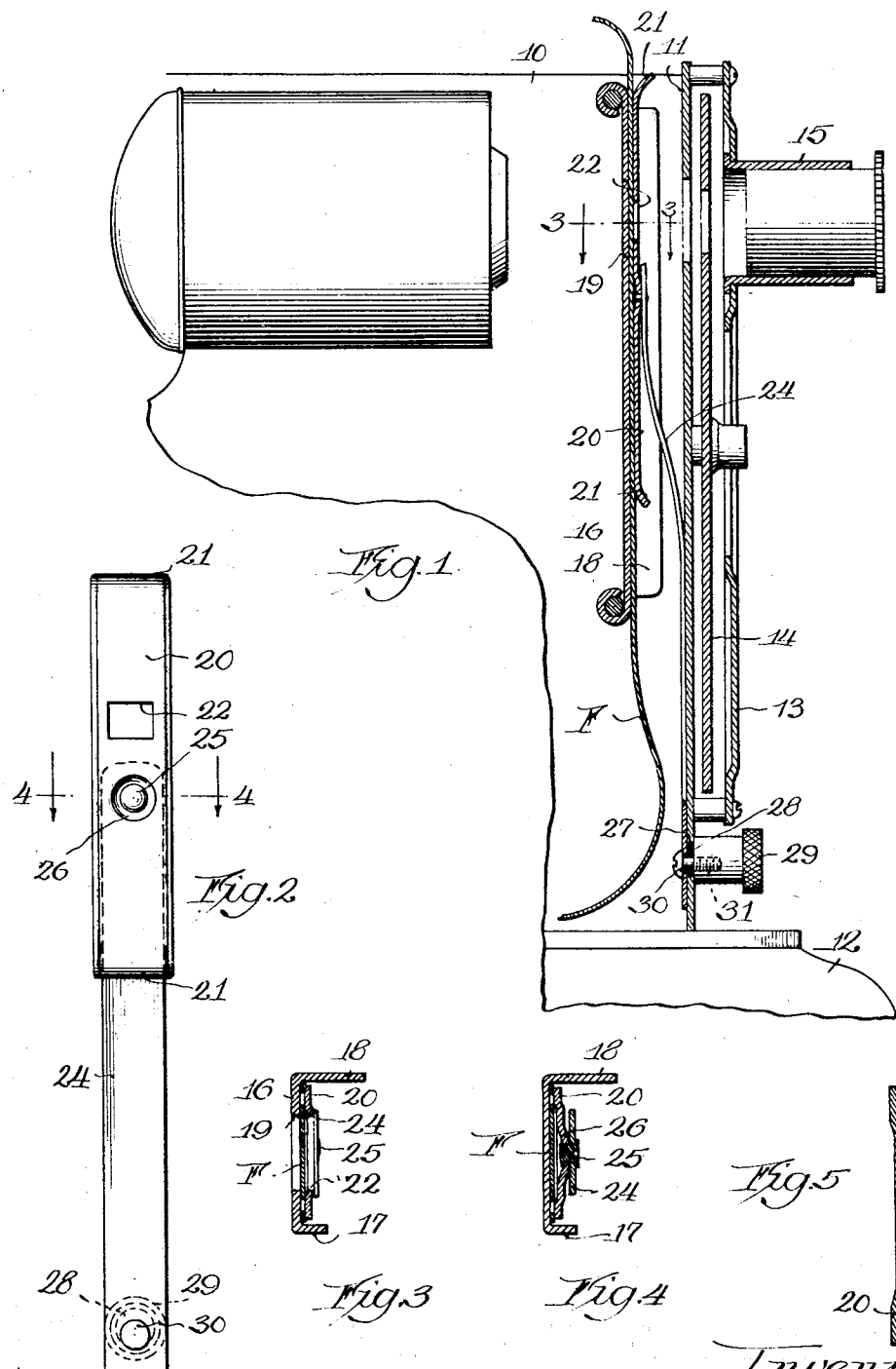
Witness:
Inventor,
Alexander Ferdinand Victor,
By Thomson Roadhouse & Lundy attys Patented Nov. 3, 1925.

1,559,815

UNITED STATES PATENT OFFICE.

ALEXANDER FERDINAND VICTOR, OF DAVENPORT, IOWA.

FILM TENSIONING AND FRAMING DEVICE.

Application filed December 10, 1923. Serial No. 679,802.

*To all whom it may concern:*

Be it known that I, ALEXANDER FERDINAND VICTOR, a subject of the King of Sweden, and resident of Davenport, in the county of Scott and State of Iowa, have invented certain new and useful Improvements in a Film Tensioning and Framing Device, of which the following is a full, clear, and exact description, such as will enable others skilled in the art to make and use the same.

My invention relates to motion picture appliances and more particularly to a structure that is adapted to maintain a tension upon the film while it is being moved past the apertured element or film guide and which, at the same time, may be readily adjusted for the purpose of framing the picture upon the screen.

Divers structures have heretofore been devised exerting a slight tension upon the longitudinal edges of the film so that during the momentary stoppage of the film during its intermittent movement through the guide it will remain stationary while one of the series of pictures is being exposed. This tension or friction will also prevent the film being moved too far or beyond the light opening by the actuating mechanism which usually operates at a high rate of speed and might "throw" or whip the film beyond its predetermined stopping points when being released. Also, there have been designed divers structures for framing or centering the film in front of the aperture so that the projected picture will be properly disposed upon the screen. It is an object of my invention to provide a single or unitary structure that will perform both the functions of framing the picture and exerting a tension upon the film during its passage past the projecting or light aperture. It is a further object of my invention to provide a structure of this character that is extremely simple in construction and which may be readily manipulated by persons unskilled in cinematography. Still further objects reside in providing a combined framing and tensioning device for film that may be readily fabricated from sheet metal by stamping operations which is dependable in performing its functions, which is novel in construction, and which is economical to manufacture.

I prefer to carry out my invention in substantially the manner shown in the drawings and hereinafter described, the drawings being, in a sense, merely diagrammatical and illustrate a preferred or typical embodiment of my invention.

In the drawings:—

Figure 1 is a vertical sectional view of a portion of a motion picture projector showing the installation of my invention.

Figure 2 is an elevation of the presser plate and framer detached.

Figure 3 is a transverse section on line 3—3 of Figure 1.

Figure 4 is a transverse section on line 4—4 of Figure 2.

Figure 5 is an enlarged transverse section of the presser plate.

Referring to the drawings, 10 designates a suitable standard or support in a motion picture projection apparatus, the front or forward end of which has transversely secured to it a vertical plate 11 that extends down to a suitable flat base 12. Spaced a slight distance from plate 11 is a disk 13 and between these elements rotates a shutter 14 of any suitable design. The lens tube 15 is mounted upon the outer plate 13, while back of and spaced a suitable distance from the transverse plate 11 is a film guide. This film guide comprises a vertically disposed elongated plate 16, the longitudinal vertical edges thereof being flanges laterally to provide opposite parallel walls 17 and 18, which, with the plate 16, provide a channel or guide of sufficient width to accommodate the film ribbon F. The film passes downwardly in the channel of this guide and past an aperture 19 therein, and it is moved by means of any suitable shuttle or other film actuating mechanism. In the drawings I have illustrated, merely for the purpose of convenience, a film moving mechanism such as disclosed in my copending application which is executed under even date herewith, filed December 10th, 1923, Serial Number 679,798 and which need not be herein described as it forms no portion of my present invention. Under ordinary conditions, that is without a tension or presser member, the film would probably be moved laterally away from the guide plate 16 during the operation of the feeding device, and it is for the purpose of maintaining the film in intimate relation to this plate and the channel formed thereby that I have designed my present presser element.

This presser element comprises a vertically elongated plate 20 having its upper and lower end portions 21 curved outwardly away from the plate 16, and at a point opposite the aperture 19 I place an aperture 22 that is of slightly smaller dimensions than said first-mentioned aperture but is of substantially the dimensions of the pictures upon the film. A bowed spring 24 has its upper end engaged with the central portion of the presser plate 20 and is loosely pivoted thereon by means of a rivet 25. As seen in the detailed drawing, (Figure 4), I form an opening for the rivet 25 and a countersunk depression 26 in the plate 20 surrounding the opening for the rivet. The adjacent end portion of the spring 24 is also provided with an opening into which this rivet is inserted and set by swaging the metal of the rivet over upon the surface of the spring. In assembling these parts, a small space is left between the inner portion of the countersunk depression 26 and the adjacent surface of the spring so that the parts will thereby have a limited swivel connection.

The lower end of the spring 24 is adjustably connected to the lower portion of the transverse plate 11 heretofore alluded to, and the tension of the spring when the same is straightened to the extent shown in the drawings is sufficient to yieldingly urge the presser plate 20 against the film which is interposed between the same and the guide plate 16. In order that the operator may readily frame the picture upon the screen and adjust the aperture 22 in the presser plate so as to be in exact registry with a picture during the momentary stoppage of the film, I have provided means for adjusting the presser plate vertically in the guide. At a point in the vertical plate 11 opposite the lower portion of the spring I form an opening 27 that provides a bearing to receive the shouldered or reduced concentric shank 28 of a rotatable handle or thumb nut 29, the outer portion of which is knurled or milled so that it may be conveniently grasped by the fingers of the operator to rotate the same to adjust the presser plate vertically. A small screw 30 is loosely passed through a hole in the lower portion of the spring and screwed into an eccentric threaded opening 31 formed in the shank 28 of the thumb nut. Thus it will be seen that by rotating this nut 29 the screw will travel in an eccentric path about the axis of rotation thereof and will thereby move the lower end of the spring in a corresponding path. Owing to the fact that the upper end of the spring is pivotally mounted with respect to the presser plate 20, and the latter can move only in a vertical direction, the upper end of the spring will be reciprocated up and down to adjust the presser plate vertically with respect to the guide plate 16. This will move the aperture 22 in the presser plate vertically with respect to the opening in the guide plate and thus permit the operator to readily adjust the aperture 22 into registry with the pictures upon the film, and it is obvious that the framing of the pictures may be accomplished during the passage of the film through the guide without disturbing the other mechanism.

What I claim is:—

1. A framing and tensioning device for film comprising a guide plate, a presser co-acting therewith and having apertures therein, means for supporting and yieldingly urging said presser plate towards the guide plate, and devices for moving said means longitudinally with respect to said guide plate whereby said aperture may be brought into registry with a picture upon the film.

2. The framing and tensioning device comprising a guide plate, a presser plate co-acting therewith and provided with an aperture, means having swivel connection with the said tension plate for supporting the latter and urging the same normally towards said guide plate, and devices for shifting said means and said presser plate longitudinally with respect to said guide plate.

3. A framing and tensioning device for film comprising a film guide, an apertured presser plate co-acting therewith, a spring supporting and urging said presser plate towards said guide, and means for moving said spring longitudinally whereby said presser plate is correspondingly moved with respect to said guide.

4. A framing and tensioning device for film comprising a guide, an apertured presser plate co-acting therewith, a bowed spring having swivel connection at its upper end with the said presser plate whereby the latter is supported, and means co-acting with the opposite end of said spring for maintaining the same under tension and for reciprocating the same longitudinally whereby the aperture in said presser plate is adjusted with respect to a picture upon the frame.

5. A framing and tensioning device for film comprising a guide, an apertured presser plate co-acting therewith, a bowed spring having swivel connection at its upper end with said presser plate whereby the latter is supported, and a cam-element connected to the lower end of said spring and supporting the same whereby the movement of said cam-element adjusts said presser plate longitudinally to adjust the picture upon the frame with the aperture in said plate.

6. A framing and tensioning device for film comprising a vertically disposed film guide, a vertically reciprocable apertured presser plate co-acting with said guide, a spring supporting said presser plate and yieldingly maintaining the same in co-action with said guide, and devices for actuating said spring to reciprocate said presser plate.

7. A framing and tensioning device for film comprising a vertically disposed film guide, a vertically reciprocable apertured presser plate co-acting therewith, a bowed spring having yieldable connection at its upper end with said presser plate for supporting the latter and urging the same toward said guide, a rotatable hand nut, and a pin eccentrically mounted upon the said hand nut and operatively connected to the lower portion of said spring whereby the rotation of said hand nut bodily moves said spring which causes a longitudinal movement of said presser plate.

Signed at Davenport, county of Scott and State of Iowa, this 6th day of December, 1923.

ALEXANDER FERDINAND VICTOR.